United States Patent [19]

Metcalf

[11] 4,358,089
[45] Nov. 9, 1982

[54] WIRE GUIDING DEVICE

[76] Inventor: Dale F. Metcalf, 657 Frederick St., Lancaster, Ohio 43130

[21] Appl. No.: 207,764

[22] Filed: Nov. 17, 1980

[51] Int. Cl.$^3$ .............................................. B66D 3/04
[52] U.S. Cl. ................................ 254/415; 248/226.4; 254/134.3 FT; 254/413
[58] Field of Search ...... 254/390, 415, 413, 134.3 FT, 254/134.3 R; 220/3.2–3.5; 226/179, 180, 194; 248/63, 226.3, 226.4, 231.1, 289.1, 291

[56] References Cited

U.S. PATENT DOCUMENTS

| | | | |
|---|---|---|---|
| 1,275,887 | 8/1918 | Finnell | 254/415 |
| 1,759,858 | 5/1930 | Kutz | 248/226.4 |
| 2,371,451 | 3/1945 | Larson | 248/226.4 |
| 2,554,544 | 5/1951 | Warner | 248/226.4 X |
| 3,218,033 | 11/1965 | Miller | 254/134.3 FT |

FOREIGN PATENT DOCUMENTS 268630 4/1927 United Kingdom ................ 254/390

*Primary Examiner*—Billy S. Taylor
*Attorney, Agent, or Firm*—Richard L. Miller

[57] ABSTRACT

A wire pulling device has a pulley wheel rotatably mounted to a clamp in the first embodiment of the invention, with the clamp being affixed to a junction box having an open side in a horizontal plane for the passage of the wire to the pulley wheel. In a second embodiment of the invention, two clamps are provided that mount the pulley wheel to the junction box where the open side of the junction box is in a vertical plane. The clamps have rotatable sleeves mounting a tie rod supporting the pulley wheel so that the sleeves may be rotated through 90 degrees when desired to change from the mode of operation of the first embodiment to that of the second, as when it is required when remounting the junction box from a ceiling to a wall.

2 Claims, 4 Drawing Figures

WIRE GUIDING DEVICE

BACKGROUND OF THE INVENTION

Electrical wire often has to be pulled through conduits that make it difficult to remove the wire from the conduit without damage thereto. Hitherto, it has been required to pull the wire by standing upon a ladder to decrease the angle of pull of the wire from the conduit, since if the pull angle is too sharp, permanent damage to the wire will result.

SUMMARY OF THE INVENTION

It is, therefore, the object of the present invention to provide a device that will allow for the movement of electrical wire or the like through a conduit without the need and trouble of using a ladder or other elevating device, so that the wire may be moved while still standing upon the ground.

To this end, the wire from the conduit is directed first to a guide tube attached to a junction box fixed in place upon a wall or ceiling. In the first embodiment of the invention, when the junction box is attached to a ceiling, a pulley wheel rotating in a vertical plane is clamped to a side of the junction box by means of a tie rod, the pulley wheel being adjustable along the length of the tie rod for proper positioning so that the wire will exit from an open side of the junction box at a relatively small angle to prevent damage thereto. The clamp of the invention also mounts one end of the tie rod, which rod extends vertically downward toward the open side of the junction box.

In the second embodiment of the invention, the junction box is mounted to a vertical wall so that the open side of the junction box extends in a vertical plane. In this embodiment, there are two clamps provided with the pulley wheel being rotatably mounted therebetween on the tie rod. In each embodiment, the clamp may have a rotatable sleeve that mounts an end of the tie rod so that direct conversion may be achieved from junction boxes mounted on a ceiling, as in the first embodiment, or on a wall, as in the second embodiment.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING

The invention will be more readily understood with reference to the accompanying drawing, wherein.

DETAILED DESCRIPTION OF THE INVENTION

Figure 1:
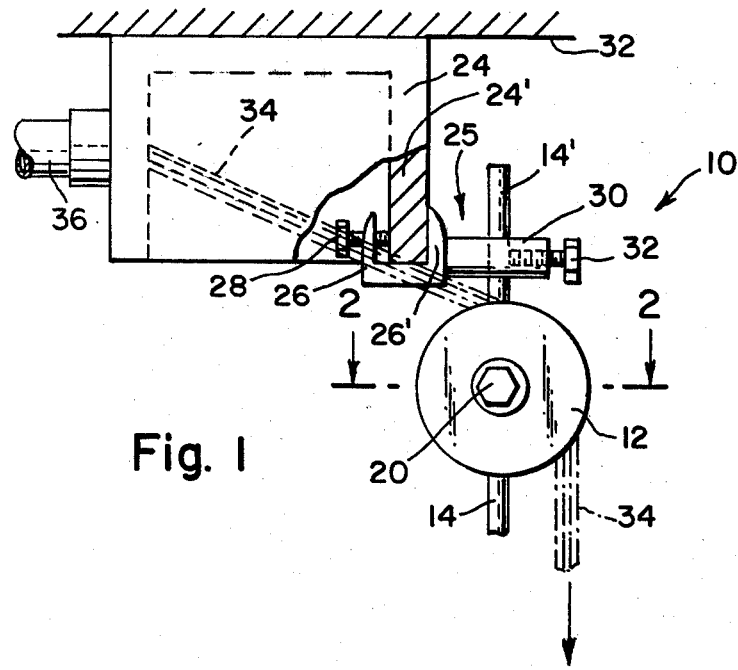
FIG. 1 is a side view of the first embodiment of the invention.
Figure 2:
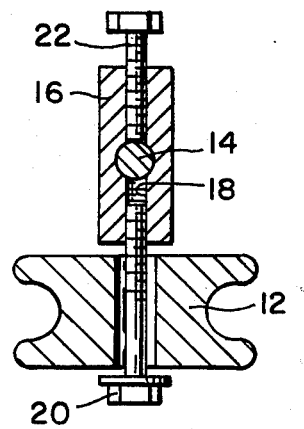
FIG. 2 is a cross-sectional view of the invention taken along line 2—2 of FIG. 1.

Referring now to the drawing, the first embodiment of the invention is shown in FIGS. 1 and 2. The wire pulling device 10 of the present invention has a freely rotating pulley wheel 12 of conventional design. The pulley wheel 12 is mounted so as to rotate in a vertical plane. A tie rod 14 supports the pulley wheel 12 by means of a threaded sleeve 16 shown in FIG. 2, which sleeve has a length-wise threaded opening 18 for receiving therein threaded axle 20 for mounting thereabout in a freely rotating manner the pulley wheel 12. The other end of the threaded opening 18 receives therein fastening bolt 22 for fastening the sleeve 16 to the tie rod 14 along a desired position of the tie rod. The tie rod 14 is received in a transverse opening perpendicular to the threaded opening 18, whereby the bolt 22 upon rotation abuts against the surface of the tie rod and clamps in place the pulley wheel 12 and sleeve 16.

The tie rod 14 may be mounted to a junction box 24 by a clamp 25. The clamp 25 has a pair of jaws 26, 26', and a threaded passageway formed through the jaw 26 for a fastening bolt 28 which clamps the assembly to a side wall 24' of a typical junction box 24. A sleeve 30 extends outwardly from the jaw 26' as can be seen in FIG. 1. The sleeve 30 has a transverse opening for passage therethrough of one end 14' of the tie rod 14, and a threaded opening for another fastening bolt 32 for abutting against the tie rod surface for securing the tie rod therein, as can be seen in FIG. 1.

In the embodiment shown in FIGS. 1 and 2, a junction box 24 is mounted to a stationary frame 32, such as a ceiling, whereby an open side faces vertically downwardly, as can be seen in FIG. 1, so that the wire 34 extending from a conduit tube 36 will exit from the junction box at a vertically downwardly extending angle directly to the pulley 12. The jaws 26, 26' do not interfere with the passage of the wire 34 to the pulley since the vertical plane in which the pulley wheel 12 is rotatably mounted is offset from the vertical plane containing therein the jaws 26, 26' due to the sleeve 16 spacing the pulley therealong.

Figure 3:
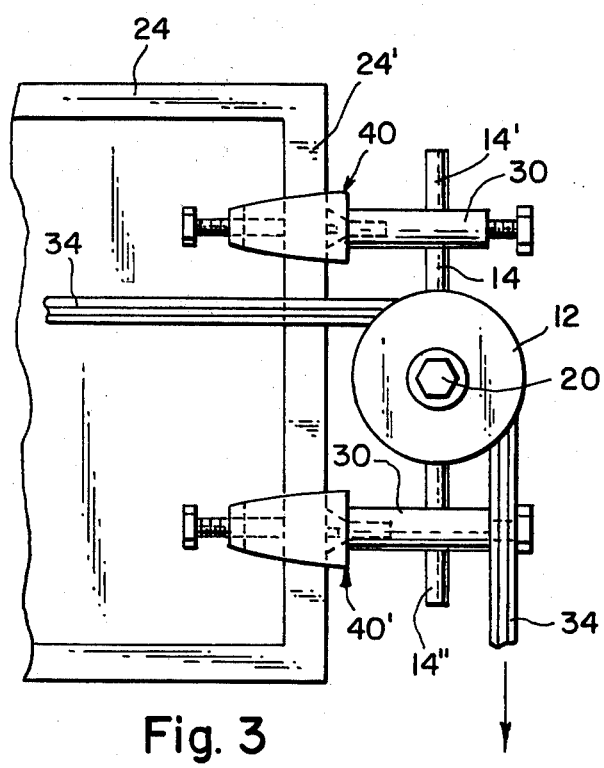
FIG. 3 is a plan view of the second embodiment of the invention.
Figure 4:
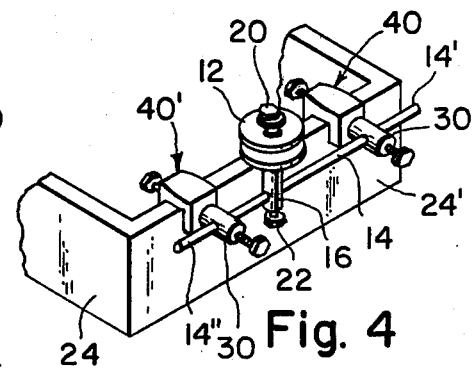
FIG. 4 is a perspective view of the second embodiment shown in FIG. 3.

In the second embodiment of the invention, there is illustrated a junction box 24 mounted on a wall, so that the open side of the junction box extends in a vertical plane, as can be seen in FIG. 3. In this case, the wire 34 exiting from the conduit will exit from the junction box also in a horizontal manner, with little or no angle relative to the plane in which the pulley wheel 12 rotates. In this embodiment, two clamps 40, 40' are provided of the same construction as the clamp 25 of FIG. 1. Clamp 40 mounts end 14' of the tie rod 14, while clamp 40' mounts the end 14" of the tie rod. The pulley wheel 12 is positioned between the two clamps 40, 40' to rotate in a vertical plane. The clamps 40, 40' are still mounted to the side 24' of the junction box 24. It can be seen, that in this embodiment, two clamps are needed so that the pulley wheel 12 will not abut against the side 24' of the junction box 24 during passage of the wire therearound. Again, the sleeve 16 spaces the pulley wheel 12 away from side 24', and is held away therefrom by the second clamp 40'.

In the first embodiment, the sleeve 30 of the clamp 25 may be rotatably mounted to the jaw 26' so that the device may be readily converted to the second embodiment's mode of operation. That is, when it is desired to mount the device to a wall junction box rather than the ceiling junction box, as in FIG. 1, the sleeve 30 may be rotated through 90 degrees in the counter-clockwise direction to the position shown in FIG. 3, and thereafter clamped in place with the second clamp 40', as described above. In this case, the sleeves of both the clamps 40, 40' will have rotatably mounted sleeves 30.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. Wire pulling device comprising, in combination, a pulley wheel; means for rotatively mounting said pulley wheel for free rotation about its axis; a tie rod mounting thereon said means for rotatively mounting said pulley wheel; means for slidingly and fixedly mounting said means for rotatively mounting said pulley wheel to said tie rod; a first clamp means having an opening formed therethrough for receiving therethrough said tie rod, said first clamp means having means for fixedly mounting said tie rod; and means for mounting said first clamp means to a fixed frame, said first clamp means comprising a pair of clamping jaws, one of which has a threaded opening formed therethrough, and a mounting bolt received through said threaded opening of said one clamping jaw, said pair of jaws sandwiching therebetween a portion of said means for mounting said first clamp means to the fixed frame, whereby wire pulled from a source through said means for mounting said first clamp is directed around said pulley wheel to prevent damage to the wire, wherein said means for rotatively mounting said pulley wheel comprises an axle having a threaded end portion and said means for slidingly and fixedly mounting said means for rotatively mounting said pulley wheel comprises a threaded sleeve having a transverse passageway formed therein for receiving therethrough said tie rod and a threaded opening perpendicular to said transverse passageway and a threaded bolt for mating engagement with said threaded opening at one end thereof, said axle and said threaded bolt being matingly received at opposite ends in said threaded opening for abutting against said tie rod to fix the position of said pulley wheel.

2. The wire pulling device according to claim 1, wherein said sleeve of said first clamp means is rotatably mounted to said other jaw of said pair of jaws.

* * * * *